A. A. GERVAIS.
CAMP-KETTLE.
No. 181,431. Patented Aug. 22, 1876.
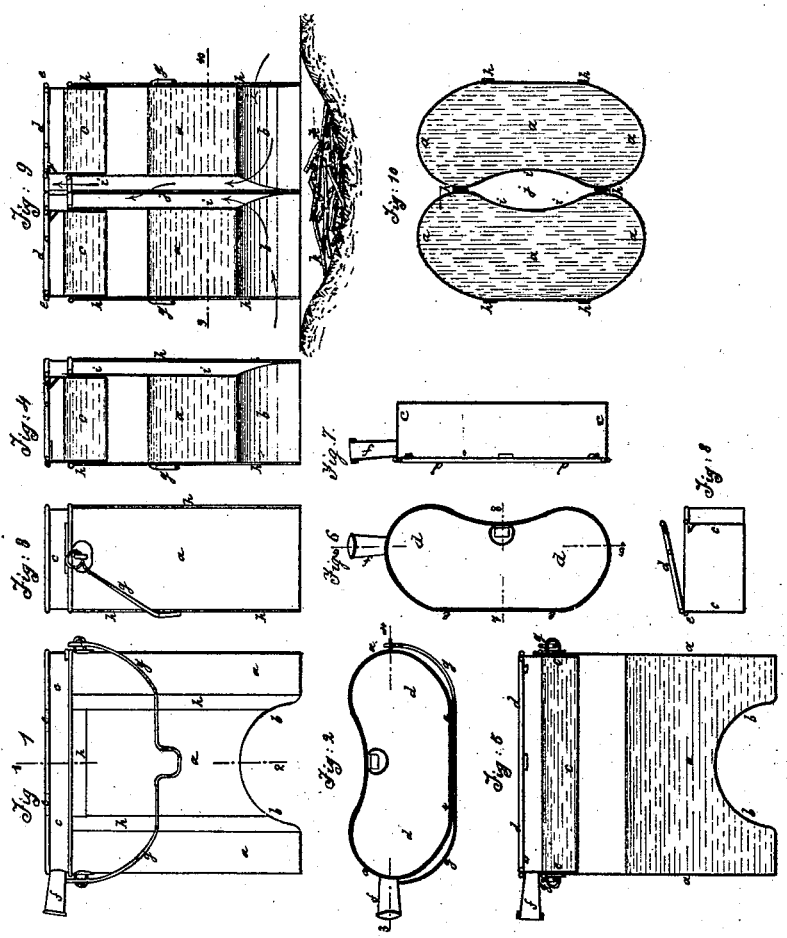
Witnesses:
Inventor:

UNITED STATES PATENT OFFICE.

ANTOINE ALEXIS GERVAIS, OF PARIS, FRANCE, ASSIGNOR TO A. GERVAIS & CO., OF SAME PLACE.

IMPROVEMENT IN CAMP-KETTLES.

Specification forming part of Letters Patent No. 181,431, dated August 22, 1876; application filed June 13, 1876.

*To all whom it may concern:*

Be it known that I, ANTOINE ALEXIS GERVAIS, of Paris, France, have invented Improvements in Camp-Kettles; and I do hereby declare that the following is a full, clear, and exact description of the same, reference being had to the annexed sheet of drawings, making a part of the same.

This invention relates to improvements in camp-kettles, more especially intended for use by an army in the field.

This invention is designed to remedy the defects of camp-kettles in present use, which in fair weather require about three hours, at least, for making soup, and this only by a considerable expenditure of fuel, while in rough weather, the fire is liable to be dispersed or extinguished by wind or rain. By the improvements of this invention a considerable saving in fuel is insured, and much less time is occupied in cooking, whatever may be the state of the weather.

The accompanying drawing illustrates the improved camp-kettles of this invention by way of example.

Figure 1 shows a longitudinal vertical elevation of the kettle, which is of flattened form; Fig. 2, a plan, and Fig. 3 an end view of same. Fig. 4 is a transverse section on line 1 2, Fig. 1; and Fig. 5, a longitudinal section on line 3 4, Fig. 2. Fig. 6 is a plan of the reservoir top; Fig. 7, a longitudinal section of same on line 5 6, Fig. 6; and Fig. 8, a transverse section on line 7 8, Fig. 6. Fig. 9 shows two kettles combined, in vertical section; and Fig. 10, a longitudinal section of same on line 9 10, Fig. 9.

The same letters of reference apply to all the above figures.

$a$, kettle, the bottom $b$ of which is made arched, as shown; $c$, deep tray or tin to hold water for cooking vegetables, and forming a cover to kettle $a$. The water in vessel $c$ is heated by the steam from the water in the kettle $a$; $d$, lid of vessel $c$, hinged thereto at $e$; $f$, handle of $c$; $g$, bail of kettle $a$; $h$, stiffening ribs or strips of metal soldered or riveted to the kettle on either side, and abutting against each other when the two kettles are placed together, as shown in Fig. 10, the concavity $i$ made on one side of each kettle forming in this case a draft-chimney, $j$; $k$, hollow made in the ground to admit of placing the fuel under the kettles.

A number of these kettles may be combined so as to have two, three, or more draft-chimneys with a single tunnel, $b$, running beneath the whole series of kettles, which are placed over a trench made in the ground.

I am aware of the fact that the arched bottom and the duplication of the water-receptacles placed one above the other are not, broadly, new, and I therefore confine my invention to the same constructed with a concavity in the side thereof, adapted to form a chimney when two or more are arranged as in Figs. 9 and 10.

What I claim is—

The camp-kettle, composed of the two vessels $a$ and $c$, having an arched bottom, and a concavity, $i$, upon its side, for the purpose described.

ANTOINE ALEXIS GERVAIS.

Witnesses:
ROBT. M. HOOPER,
FELIX ORETZ.